United States Patent
Hermeler et al.

(10) Patent No.: US 11,219,905 B2
(45) Date of Patent: Jan. 11, 2022

(54) COOLING DEVICE FOR A DRIVE OF A SOLID BOWL SCREW CENTRIFUGE

(71) Applicant: GEA Mechanical Equipment GmbH, Oelde (DE)

(72) Inventors: Juergen Hermeler, Sassenberg (DE); Volker Knospe, Muenster (DE); Martin Overberg, Herzebrock-Clarholz (DE); Stefan Terholsen, Oelde (DE); Andreas Knobel, Oelde (DE); Christian Driftschroeer, Delbrueck (DE)

(73) Assignee: GEA Mechanical Equipment GmbH, Oelde (DE)

( * ) Notice: Subject to any disclaimer, the term of this patent is extended or adjusted under 35 U.S.C. 154(b) by 626 days.

(21) Appl. No.: 15/760,896

(22) PCT Filed: Sep. 1, 2016

(86) PCT No.: PCT/EP2016/070662
§ 371 (c)(1),
(2) Date: Mar. 16, 2018

(87) PCT Pub. No.: WO2017/045929
PCT Pub. Date: Mar. 23, 2017

(65) Prior Publication Data
US 2018/0280993 A1    Oct. 4, 2018

(30) Foreign Application Priority Data
Sep. 17, 2015 (DE) ............ 10 2015 115 720.9

(51) Int. Cl.
*B04B 15/02* (2006.01)
*B04B 1/20* (2006.01)
(Continued)

(52) U.S. Cl.
CPC ............ *B04B 15/02* (2013.01); *B04B 1/2016* (2013.01); *B04B 9/08* (2013.01); *F16H 57/0416* (2013.01);
(Continued)

(58) Field of Classification Search
CPC ......... B04B 15/02; B04B 1/2016; B04B 9/08; B04B 2001/2025; F16H 57/0416; F16H 57/0486; F16H 1/28
(Continued)

(56) References Cited

U.S. PATENT DOCUMENTS

| | | | | |
|---|---|---|---|---|
| 4,327,862 A | * | 5/1982 | Jakobs | B04B 1/2016 494/37 |
| 2002/0183186 A1 | | 12/2002 | Caldwell | |

(Continued)

FOREIGN PATENT DOCUMENTS

| | | |
|---|---|---|
| CN | 202097039 U | 1/2012 |
| CN | 202191968 U | 4/2012 |

(Continued)

OTHER PUBLICATIONS

DE 202012012743 Description Espacenet Machine Translation.*
(Continued)

*Primary Examiner* — Walter D. Griffin
*Assistant Examiner* — Shuyi S. Liu
(74) *Attorney, Agent, or Firm* — Crowell & Moring LLP (57) ABSTRACT

A drive device for a solid bowl screw centrifuge includes a motor for rotating a drum of the centrifuge, a transmission which is connected between the motor and the drum, and a cooling device for cooling the transmission during operation when the drum is rotating. The cooling device is an annular body which is fitted on the outside of the transmission and
(Continued)

has an air guiding device that conducts air from farther outwards radially inwards onto a surface of the transmission.

9 Claims, 7 Drawing Sheets

(51) Int. Cl.
    *B04B 9/08*     (2006.01)
    *F16H 57/04*     (2010.01)
    *F16H 1/28*     (2006.01)

(52) U.S. Cl.
    CPC .. *F16H 57/0486* (2013.01); *B04B 2001/2025* (2013.01); *F16H 1/28* (2013.01)

(58) Field of Classification Search
    USPC .......................................... 494/14, 37, 53, 84
    See application file for complete search history.

(56) References Cited

U.S. PATENT DOCUMENTS

| | | | |
|---|---|---|---|
| 2013/0220766 A1* | 8/2013 | Tadych | F16H 57/0416 192/113.23 |
| 2017/0189916 A1* | 7/2017 | Eberle | B04B 7/06 |

FOREIGN PATENT DOCUMENTS

| | | | | |
|---|---|---|---|---|
| CN | 203108669 U | | 8/2013 | |
| DE | 10 2006 028 804 A1 | | 12/2007 | |
| DE | 20 2012 012 743 U1 | | 10/2013 | |
| DE | 202012012743 U1 | * | 10/2013 | ............... H02K 5/18 |
| EP | 3 154 703 B1 | | 4/2017 | |
| GB | 2393142 A | * | 3/2004 | ........... B04B 1/2016 |
| GB | 2 393 142 B | | 11/2004 | |
| JP | 2004-532728 A | | 10/2004 | |
| JP | 2011-122645 A | | 6/2011 | |
| WO | WO 2013/070150 A1 | | 5/2013 | |
| WO | WO 2015/189349 A1 | | 12/2015 | |
| WO | WO-2016168439 A1 | * | 10/2016 | ......... F16H 61/6649 |

OTHER PUBLICATIONS

Chinese-language Chinese Office Action issued in Chinese counterpart application No. 201680053842.0 dated May 29, 2019 (Seven (7) pages).

Japanese Office Action issued in Japanese application No. 2018-534003 dated Mar. 17, 2020, with English translation (Five (5) pages).

PCT/EP2016/070662, International Search Report (PCT/ISA/210) dated Nov. 18, 2016, with partial English translation, enclosing Written Opinion of the International Searching Authority (PCT/ISA/237) (Eleven (11) pages).

German Search Report issued in German counterpart application No. 10 2015 115 720.9 dated Apr. 28, 2016, with Statement of Relevancy (Eight (8) pages).

* cited by examiner

COOLING DEVICE FOR A DRIVE OF A SOLID BOWL SCREW CENTRIFUGE

BACKGROUND AND SUMMARY OF THE INVENTION

The invention relates to a drive device for a solid bowl screw centrifuge.

Such a solid bowl screw centrifuge—also called a decanter—is known from DE 10 2006 028 804 A1. During operation, the orbiting transmission of the drive device heats up. It is known in this respect to use transmission cooling devices, by means of which this effect is intended to be counteracted.

As transmission cooling devices, external oil coolers are known on the one hand. In this case the oil is directed via a rotating device into the orbiting transmission—which has at least one rotating outer part—and discharged again. It is furthermore known that cooling of the transmission can be improved by means of a more intense air circulation. The friction forces of the rotating transmission surface are utilized in the process in order to create an airflow around the transmission, by means of which the air on the transmission surface is directed away from this in the radially outward direction. Also known are solutions in which the transmission is provided with a housing. Via vanes which are attached on the rotating transmission, an airflow for cooling is created axially and directed into the housing.

Against this background, the invention has the object of counteracting the effect of transmission heating on a transmission of a drive device for a centrifuge using simple constructional means.

Created is a drive device for a solid bowl screw centrifuge, with at least one motor for rotating a drum of the centrifuge, a transmission which is connected between motor and drum, and a cooling device for cooling the transmission in operation during rotations of the drum. This cooling device is designed as an annular body which is mounted on the transmission on the outside and which has at least one air guiding device which is designed for the purpose of directing air onto the outer surface of the transmission radially from farther on the outside radially farther inward.

By means of the transmission cooling device, the forced convective heat transfer from the transmission to the surroundings is improved in a simple constructional manner.

According to an advantageous development, by means of which the cooling effect is further increased, a plurality of the air guiding devices are formed on the annular body.

The annular body preferably has a ring, or a plurality of rings, which are preferably designed as radially oriented annular disks. These rings can be easily fastened on the transmission and on the other hand allow the attachment of the air guiding devices in a simple manner. The rings, moreover, can be additionally used themselves for air guiding.

According to an advantageous variant, one or more of the air guiding devices is/are formed between two axially spaced apart rings of the annular body, wherein the one or more air guiding devices which are formed between the two axially spaced apart rings of the annular body act as vanes on the one hand which increase the airflow in the surroundings of the transmission and on the other hand act with air guiding effect by them guiding the airflow from radially farther on the outside to radially closer to the transmission surface. In particular, it is possible in such a way that one or more of the air guiding devices and the rings in the installed state together form a casing around the transmission which at one or more points has inlets arranged radially more toward the outside and outlets which lie radially more toward the inside, preferably relative thereto.

The transmission is preferably designed as a planetary transmission or orbiting transmission, which within the sense of this application means that it has at least one transmission outer part which rotates during operation, that is to say a completely or partially free lying part radially toward the outside, by means of which the annular body rotates in a rotational direction during operation. It will also have further rotating parts—for example radially more toward the inside.

The invention is described in more detail below based on exemplary embodiments with reference to the drawings.

DETAILED DESCRIPTION OF THE DRAWINGS

Figure 5:
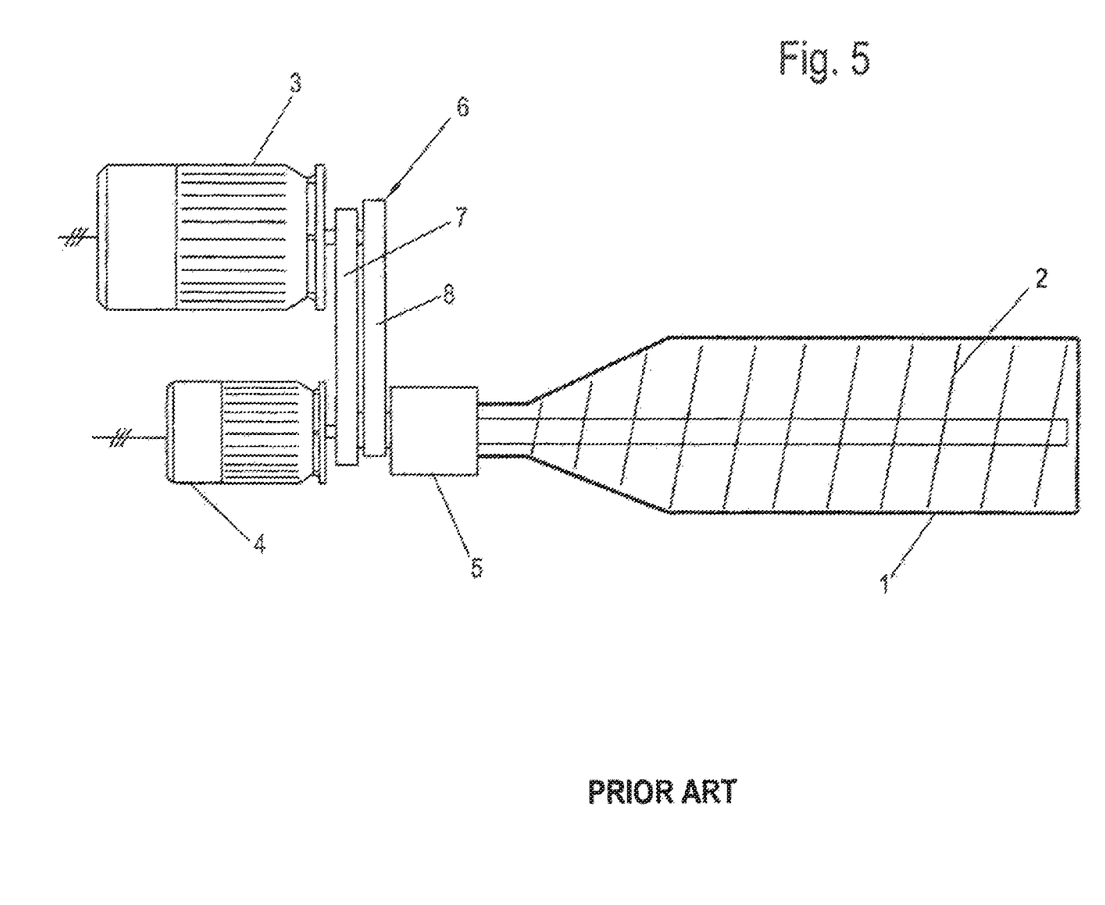
FIG. 5 shows a schematic view of a known solid bowl screw centrifuge with a drive device without a transmission cooling device.

FIG. 5 shows a solid bowl screw centrifuge—also called a decanter—with a rotatable drum 1 with a preferably horizontal rotational axis and an also rotatable screw 2 which is arranged inside the drum 1.

The drum 1 of FIG. 5 is by way of example arranged between a drive side drum bearing and a drum bearing facing away from the drive (not shown) and by means of these drum bearings is rotatably supported on a machine frame/foundation (not shown either). Details such as an inlet for a product, a distributor and product outlets are not shown in FIG. 5, but are known in principle. In the solid bowl screw centrifuge, a product to be processed is separated into two or three phases during rotation of the drum 1, wherein a solid phase and at least one cleared liquid phase result. If applicable, the liquid phase can also possibly be separated into two or more liquid phases of different density.

The product (mixture) to be processed is directed through a central pipe into the rotating drum 1. In the drum 1, this product is cleared of a solid phase or an aqueous phase. The solid phase has to be pushed along the screw 2 against the centrifugal force of the particles.

In the drum 1, the screw 2, which is rotated at a low relative rotational speed in the relation to the drum 1, is therefore rotatably supported. In this way, the screw 2 brings about the required delivery of the solid material or of the solid phase in the direction of a solid material outlet (as a rule at a conical end of the drum 1).

For rotating the drum 1 and the screw 2, the solid bowl screw centrifuge has a drive system. A first drive motor—called the main motor 3—serves primarily for rotating the drum 1 and a second drive motor—called the secondary motor 4—serves primarily for creating a variable differential speed between the drum 1 and the screw 2. A transmission 5 can be provided between the drive motors on one side and between the drum 1 and the screw 2 on the other side. This transmission 5 can be designed for example as a planetary transmission with one or more stages. It can also be an orbiting cam plate transmission. Such an arrangement is known for example from the generic DE 10 2006 028 804 A1.

The main motor 3 is connected via a belt drive 6, having two belts 7, 8 by way of example here, to the transmission 5 and to the drum 1. The main motor 3 serves for supplying the discharge power for cleared fluid and the solid material and provides the off-load power. The torque which occurs during operation between the screw 2 and the drum 1 is created here via the transmission 5. The required power for the solid material delivery—that is to say the variable differential rotational speed between the drum 1 and the screw 2—is supplied to the transmission 5 via the secondary motor 4.

The main motor 3 and the secondary motor 4—preferably via a frequency converter in each case, not shown here, which is connected upstream to them, are connected to an alternating current system—usually a three-phase current system, and in this way are provided with electric power.

Figure 3A:
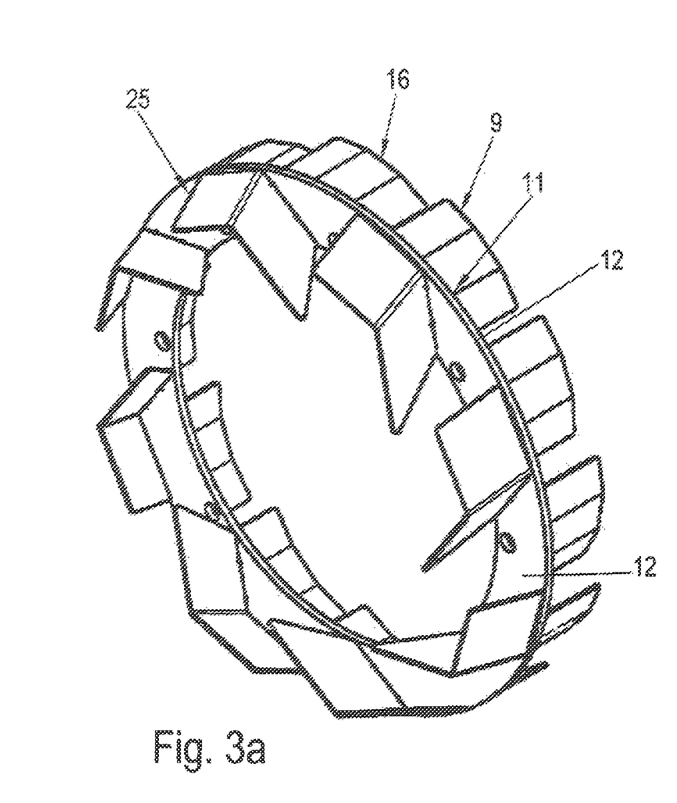
FIGS. 3a and 3b show two different perspective views of a further transmission cooling device for a transmission of a solid bowl screw centrifuge.

During operation, the transmission 5 heats up one account of flank friction, bearing and seal friction and splash losses. In order to counteract this effect, the transmission 5—preferably a planetary transmission—is cooled by means of a transmission cooling device 9 (FIG. 1a, b; FIGS. 3a, b).

Figure 2A:
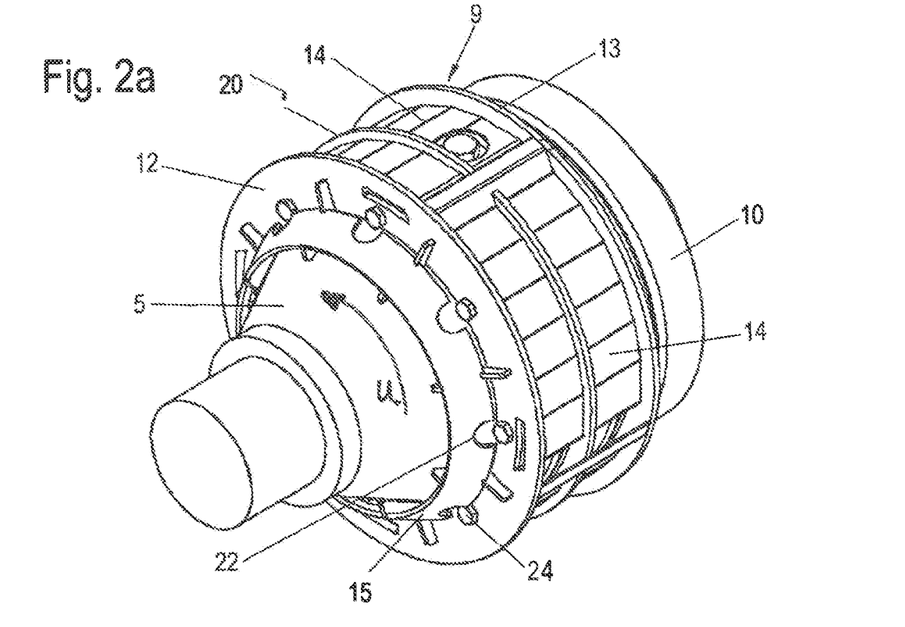
FIGS. 2a-2e show different views of a transmission for a drive device of a solid bowl screw centrifuge with a transmission cooling device.
Figure 2B:
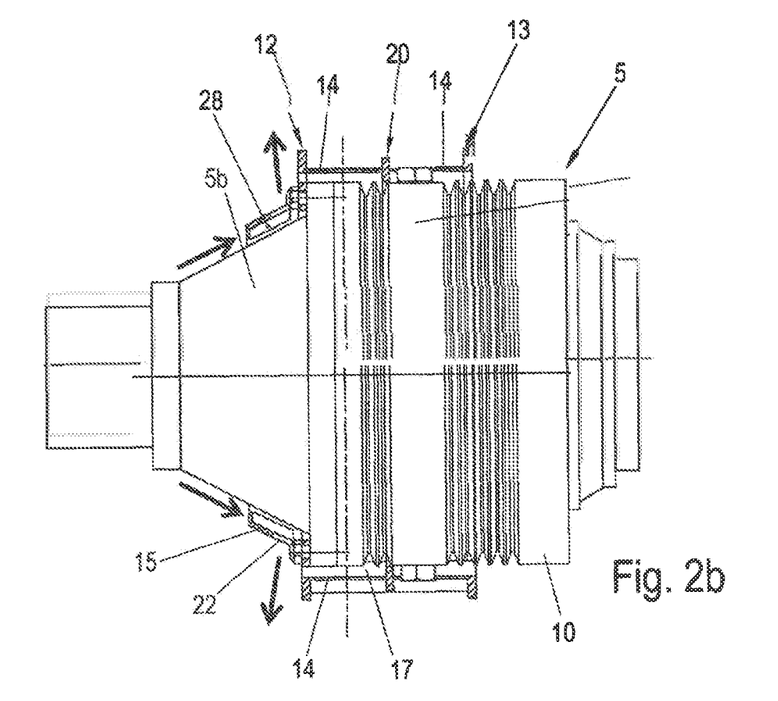
Figures 2C, 2D, 2E:
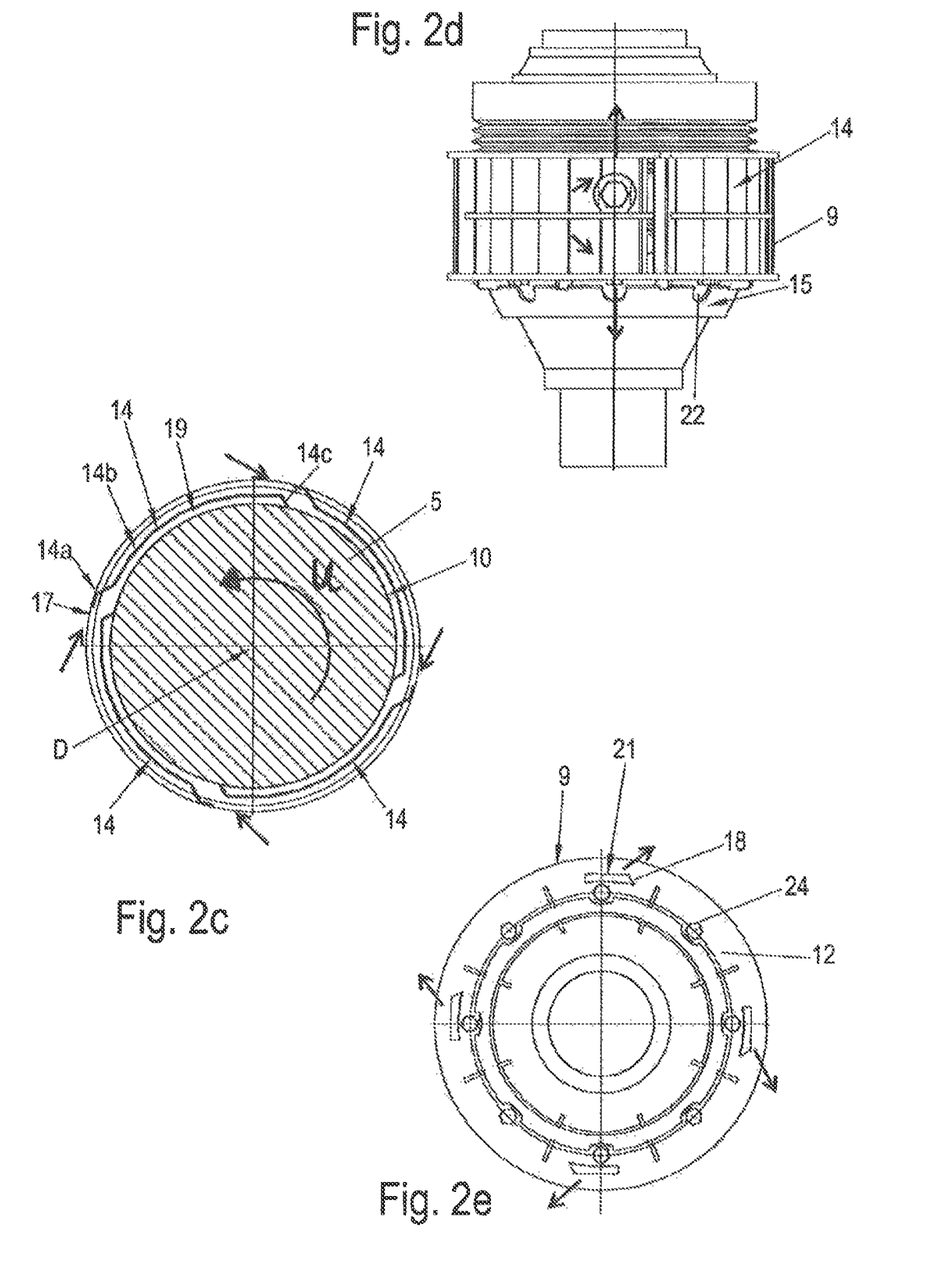
Figure 4A:
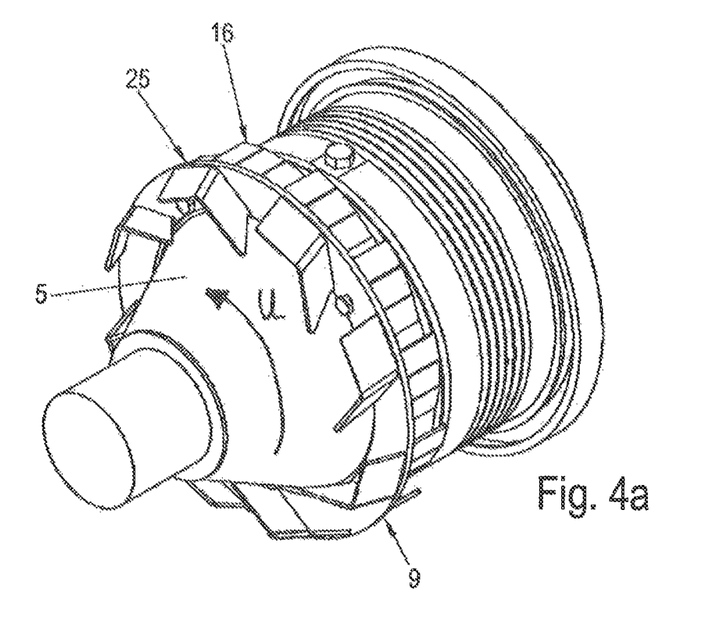
FIGS. 4a-4e shows different views of a transmission for a drive device of a solid bowl screw centrifuge with a transmission cooling device.
Figure 4B:
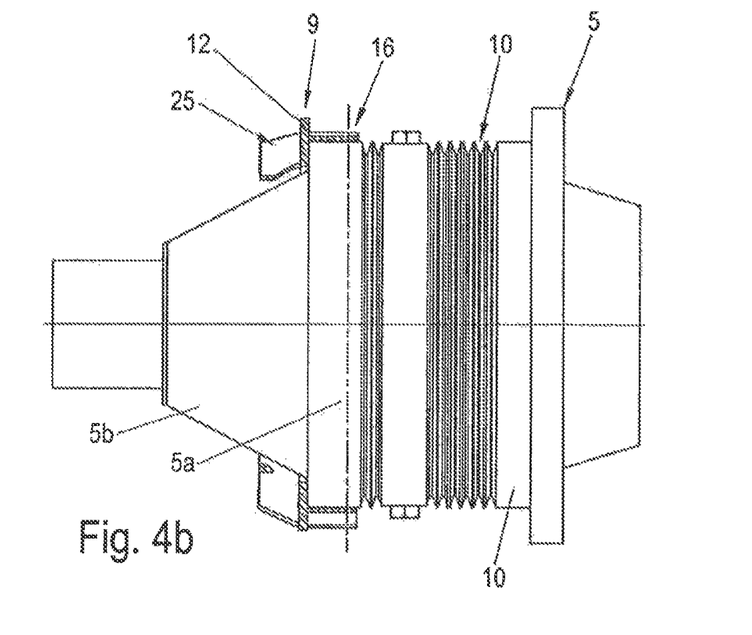

The transmission 5—see also FIG. 2b or FIG. 4b—has an outer part 10 which rotates in a rotational direction U during operation. The transmission cooling device 9 is in the main mounted on this rotating outer part 10 of the transmission 5 on the outside and concentrically encompasses it via a part of its axial extent (not where drive belts are provided). The rotational axis, to which the terms "radial" and "axial" are subsequently related, is identified by D in FIG. 2c and extends perpendicularly to the plane of FIG. 2c.

According to FIGS. 1a, 1b and 2a-2e, the transmission cooling device 9 is designed as an annular body 11 which is mounted on the transmission and at least in certain sections encompasses, or even preferably encases, the outer part 10 of the transmission 5 on the outside.

Figure 1A:
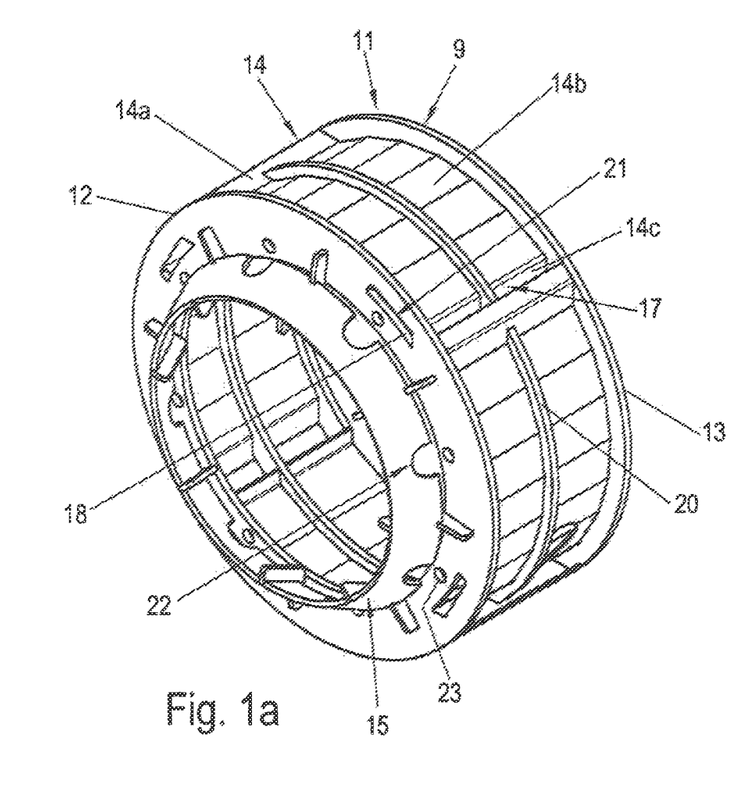
FIGS. 1a and b show two different perspective views of a transmission cooling device for an orbiting transmission for a drive device for a solid bowl screw centrifuge.
Figure 1B:
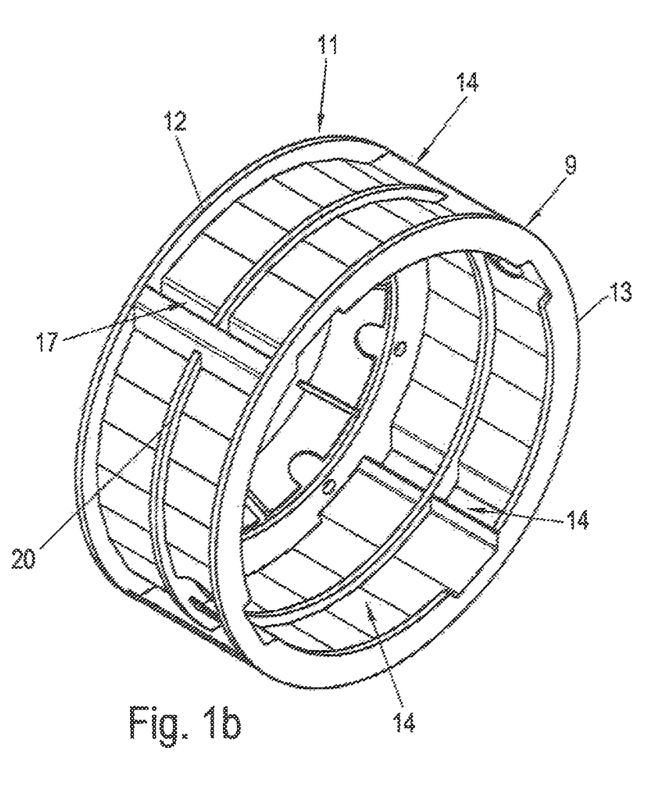
Figure 3B:
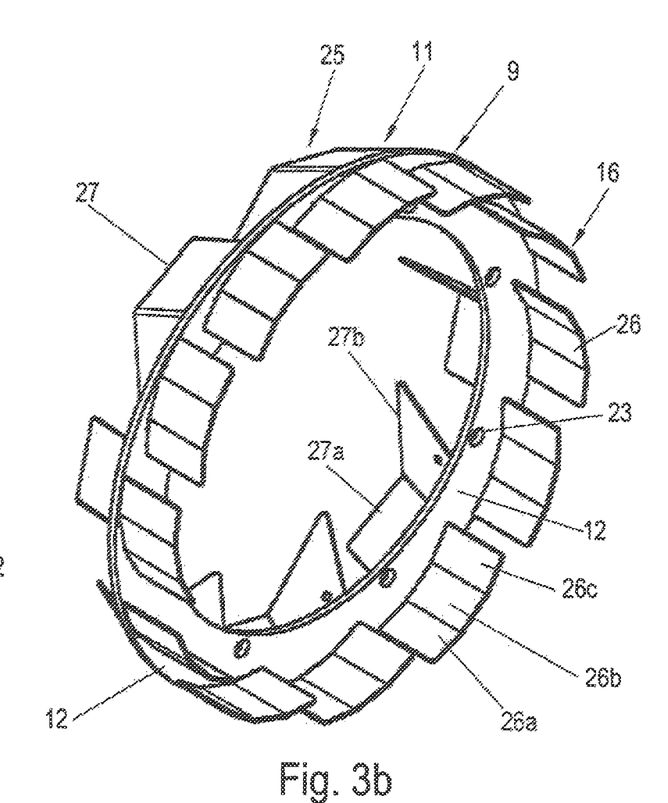

The annular body 11 has at least one ring 12—see FIGS. 3a, 3b, —or —see FIGS. 1a, 1b—two or more axially spaced apart rings 12, 13 on which are formed, especially mounted, at least one, or a plurality of, air guiding device(s) 14, 15, 16, 25. The rings 12, 13 are designed as radially oriented annular disks which by holes 23 can be mounted on the transmission 5, e.g., on an axial section of the transmission, by means of screws 24 (FIGS. 1a or 2a) or the like, however, other alternative types of fastening on the transmission 5 are conceivable.

It is preferred and constructionally simple to be implemented that one, or a plurality of, sheet metal plate(s) form(s) the air guiding devices 14, 15, 16, 25. According to FIGS. 1a, 1b, the air guiding devices 14 are in each case formed in one piece, by bending, from cut out sheet metal strips. These are fastened on the one ring 12 or on the plurality of rings 12, 13.

The air guiding devices 14, 15, 16, 25 of FIGS. 1a, 1b and FIGS. 3a, 3b are designed and oriented in such a way that they guide air from radially farther on the outside to radially closer to the surface of the transmission 5. The air guiding devices 14, 16, 25 in this case act on the one hand as vanes which increase the airflow in the surroundings of the transmission 5 and direct this in any case for the predominant part on account of their geometry from radially farther on the outside to radially closer to the transmission surface until it flows away again from there.

The one or plurality of air guiding device(s) 14, 15 16, 25 can in each case be formed in one piece or in a multiple of pieces. They are fastened on the ring 12 (FIGS. 3a, 3b) or on the rings 12, 13, and according to FIGS. 1a, 1b between the rings 12, 13. According to FIGS. 1a, 1b, the air guiding devices 14 and the rings 12, 13 in combination form a type of casing around the transmission 5, in this case around the rotating transmission outer part 10 which at a number of points has inlets 17 and outlets 18 in a manner which is to be discussed below.

According to FIGS. 1a, 1b and 2a-2e, the transmission cooling device 9 has one or preferably a plurality of—four in FIGS. 1a, 1b—the air guiding device(s) 14 which is/are circumferentially distributed between the two rings 12, 13. These are formed in such a way that during rotations of the transmission 5 they direct air, in each case in an outer vane-like air collecting region 14a at the respective inlet 17, radially inward toward the transmission outer surface where, in a gap 19 between the transmission outer surface and a circumferential air guiding region 14b, the air is further directed in the circumferential direction until the air, in each case in front of a radial section 14c which preferably is in contact or almost in contact with the transmission outer surface, is prevented from flowing further. This air can then escape axially through axial breakthroughs or cutouts 21—which in this case form the outlets 18—in the rings 12, 13. The outlets 18 lie radially more toward the inside than the inlets 17 (the airflow is represented by thicker black arrows in FIGS. 2b-2e and FIGS. 4c-4e).

In principle, a type of preferably almost closed casing is formed around the transmission 5, but which at a number of circumferential positions has the openings or inlets 17 and outlets 18, wherein, however, similar to a pitot tube effect, air backs up and is directed through the gap 19 between transmission 5 and casing.

The air guiding devices 14 can be stabilized in the circumferential direction for example by means of a further ring 20 which lies axially between the rings 12, 13. The air guiding devices 14 act especially in a transmission region 5a which is completely or largely cylindrical with regard to the external contour.

On one of the two rings 12, 13 provision is made for a further air guiding device 15—also conically formed in this case—which is designed as a conical sheet metal ring. In this way, a conical gap 28 (FIG. 2b) is formed between the transmission 5 and the air guiding device 15 having at least one inlet and at least one outlet. Toward the ring 12, the air guiding device 15 has one, or a plurality of, window(s) or cutout(s) 22 as outlets. In this way air, is drawn through the gap 28 in this case and can escape radially outward through the windows or cutouts 22 as outlets (FIG. 2b). This optional air guiding device 15, unlike the air guiding devices 14, 16, 25 also blasts the air radially onto the surface, which is conical in this case. It acts with completely cooling effect in the conical transmission region 5b and is therefore advantageous.

Figures 4C, 4D, 4E:
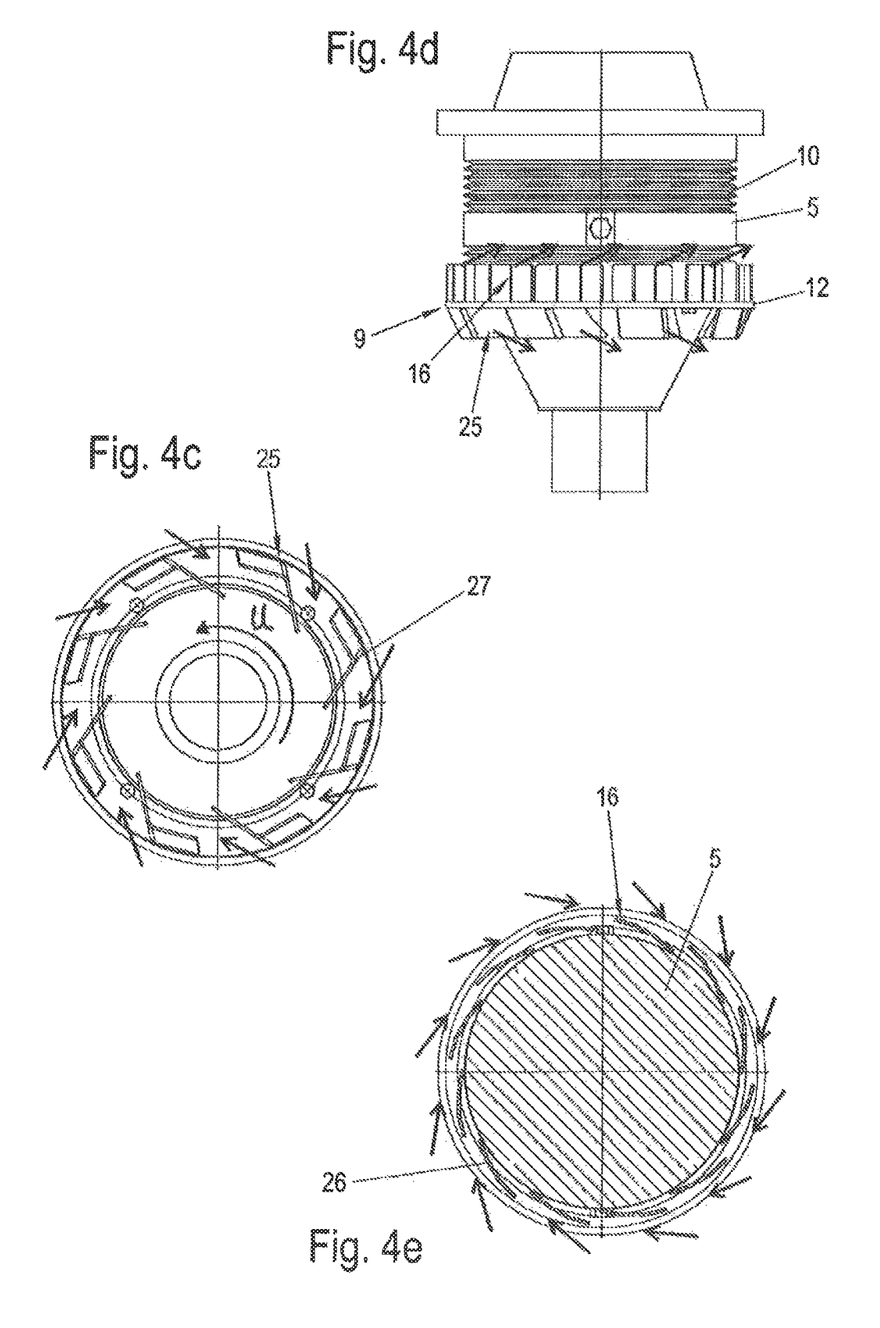

According to FIG. 3a, 3b or 4a-e, only one of the rings 12 is provided on the transmission cooling device 9, which is again designed as an annular body 11. This ring 12 is again designed in the style of a radially extending annular disk. The air guiding devices 16 and 25 are formed on the two axial sides of this ring 12. These air guiding devices 16 and 25 have in each case a multiplicity of air deflection plates 26, 27 which are arranged in a circumferentially distributed manner on the two sides of the ring 12. These air deflection plates 26, 27 again have in each case at least one section 26a, 27a which is oriented more in the circumferential direction or more in the tangential direction and, adjoining these, at least one or more sections 26b, c; 27b which are bent further in the radial direction. In this way, air is directed further from the outside inward onto the transmission during operation. The air deflection plates 26 or the air guiding device 16 at one end extend radially as far as the surface of the rotating transmission part 10 (FIG. 4e). In this way, a type of casing is again formed, wherein the rotation through the surrounding air basically heats only the air deflection plates 26 which act as a casing. The air which is directed toward the rotating transmission part 10 backs up in front of the surface and flows away axially to the side so that the transmission surface is also cooled by the airflow which develops in such a way.

The air guiding devices 16 are provided in this case for the purpose of directing air into the rather cylindrical region 5a of the transmission 5 and the air guiding devices 25 are provided for the purpose of directing air into the rather conical region 5b of the transmission 5. Air is again directed radially from the outside inward toward the transmission 5, wherein the air can escape axially to the side from the air guiding devices 16, 26 on the outer circumference of the transmission 5 (see FIGS. 4a-4e).

LIST OF REFERENCE CHARACTERS

Drum 1
Screw 2
Main motor 3
Secondary motor 4
Transmission 5
Cylindrical transmission region 5a
Conical transmission region 5b
Belt drive 6
Belt 7, 8
Transmission cooling device 9
Transmission outer part 10
Annular body 11
Rings 12, 13
Air guiding devices 14, 15, 16
Air collecting region 14a
Circumferential air guiding region 14b
Radial section 14c
Inlets 17
Outlets 18
Gap 19
Ring 20
Cutouts 21
Cutouts 22
Holes 23
Screws 24
Air guiding devices 25
Air deflection plates 26, 27
Section 26a, 27a; 26b, 27b; 27c
Gap 28
Rotational axis D
Rotational direction U

The invention claimed is:

1. A drive device for a solid bowl screw centrifuge, comprising:
a motor, wherein a drum of the solid bowl screw centrifuge is rotatable by the motor;
a transmission connected to the motor; and
a cooling device, wherein the transmission is coolable by the cooling device, wherein the cooling device is an annular body which is mounted on the transmission and fastened on the transmission, wherein the annular body has an air guiding device, and wherein air is directable radially inward onto a surface of the transmission by the air guiding device;
wherein the annular body has a plurality of air guiding devices, wherein the annular body has a plurality of rings that are each radially oriented annular disks, and wherein the plurality of air guiding devices are formed between two axially spaced apart rings of the plurality of rings.

2. The drive device as claimed in claim 1, wherein the plurality of air guiding devices act as vanes and increase an airflow in a surrounding of the transmission and wherein the plurality of air guiding devices guide the airflow from being radially farther from the transmission surface to being radially closer to the transmission surface.

3. The drive device as claimed in claim 1, wherein the plurality of rings each define a cutout through which the air can escape axially from the annular body.

4. The drive device as claimed in claim 1, further comprising a secondary motor and wherein the transmission is connected to the secondary motor.

5. The drive device as claimed in claim 1, wherein the transmission is an orbiting transmission.

6. The drive device as claimed in claim 5, wherein the orbiting transmission is a planetary transmission.

7. A drive device for a solid bowl screw centrifuge, comprising:
a motor, wherein a drum of the solid bowl screw centrifuge is rotatable by the motor;
a transmission connected to the motor; and
a cooling device, wherein the transmission is coolable by the cooling device, wherein the cooling device is an annular body which is mounted on the transmission and fastened on the transmission, wherein the annular body has an air guiding device, and wherein air is directable radially inward onto a surface of the transmission by the air guiding device;
wherein the annular body has a plurality of rings that are each radially oriented annular disks, wherein the air guiding device and at least two of the plurality of rings form a casing around the transmission, wherein the casing has an inlet and an outlet, and wherein the inlet is disposed radially farther from the transmission than the outlet.

8. The drive device as claimed in claim 7, wherein during rotations of the transmission, the air guiding device directs the air from the inlet to a collecting region, from the collecting region radially inward toward the transmission surface and to a gap between the transmission surface and a circumferential air guiding region, from the gap to a radial section which extends to the transmission surface, and to the outlet.

9. A solid bowl screw centrifuge, comprising:
a drum and a screw;
a first motor and a second motor;
a transmission, wherein the transmission is connected between the drum and the screw on a first side and the first motor and the second motor on a second side; and
a cooling device, wherein the transmission is coolable by the cooling device, wherein the cooling device is an annular body which is mounted on the transmission and fastened on the transmission, wherein the annular body has an air guiding device, and wherein air is directable radially inward onto a surface of the transmission by the air guiding device;

wherein the annular body has a plurality of air guiding devices, wherein the annular body has a plurality of rings that are each radially oriented annular disks, and wherein the plurality of air guiding devices are formed between two axially spaced apart rings of the plurality of rings.

\* \* \* \* \*